United States Patent [19]
Kametani

[11] Patent Number: 5,530,889
[45] Date of Patent: Jun. 25, 1996

[54] HIERARCHICAL STRUCTURE PROCESSOR HAVING AT LEAST ONE SUB-SEQUENCER FOR EXECUTING BASIC INSTRUCTIONS OF A MACRO INSTRUCTION

[75] Inventor: Masatsugu Kametani, Tsuchiura, Japan

[73] Assignee: Hitachi, Ltd., Tokyo, Japan

[21] Appl. No.: 405,925

[22] Filed: Mar. 16, 1995

Related U.S. Application Data

[63] Continuation of Ser. No. 907,551, Jul. 2, 1992, abandoned.

[30] Foreign Application Priority Data

Jul. 3, 1991 [JP] Japan .................................. 3-162631

[51] Int. Cl.$^6$ .................................................. G06F 7/38
[52] U.S. Cl. .................. 395/800; 395/375; 304/DIG. 1; 304/736; 304/228; 304/228.6; 304/258
[58] Field of Search .................................. 395/800, 375, 395/500, 775, 800; 364/734–736

[56] References Cited

U.S. PATENT DOCUMENTS

| | | | |
|---|---|---|---|
| 4,750,110 | 6/1988 | Mothersole et al. | 395/375 |
| 4,809,169 | 2/1989 | Sfarti et al. | 395/800 |
| 4,853,847 | 8/1989 | Ohuchi | 395/425 |
| 4,894,768 | 1/1990 | Iwasaki et al. | 395/200 |
| 4,914,578 | 4/1990 | MacGregor et al. | 395/375 |
| 4,926,318 | 5/1990 | Nakayama | 395/200 |
| 4,956,800 | 9/1990 | Kametani | 364/736 |
| 5,088,034 | 2/1992 | Ihara et al. | 395/700 |
| 5,218,711 | 6/1993 | Yoshida | 395/800 |
| 5,226,170 | 7/1993 | Rubinfeld | 395/800 |
| 5,247,628 | 9/1993 | Grohoski | 395/375 |
| 5,257,358 | 10/1993 | Cohen | 395/375 |

FOREIGN PATENT DOCUMENTS

| | | |
|---|---|---|
| A0123337 | 10/1984 | European Pat. Off. . |
| A-0242879 | 10/1987 | European Pat. Off. . |
| A0280821 | 9/1988 | European Pat. Off. . |
| A0306533 | 3/1989 | European Pat. Off. . |
| A0385136 | 9/1990 | European Pat. Off. . |
| A-63-316133 | 12/1988 | Japan . |

*Primary Examiner*—Mehmet Geckil
*Attorney, Agent, or Firm*—Antonelli, Terry, Stout & Kraus

[57] ABSTRACT

A hierarchical structure processor including a memory for storing processing instruction code data described sequentially; a main CPU for fetching and decoding the processing instruction code data and generating an executing sequence, the main CPU having buses for transferring instructions, data control signals; and a plurality of sub CPUs connected to the main CPU through the buses for executing basic instructions received from the main CPU. The main CPU includes a bus controller for sending a macro instruction indicative of the basic processing to one of the sub CPUs and for receiving an execution result of the processing designated by the macro instruction from the sub CPU. The bus controller waits for a READY signal from the associated sub CPU having the execution result. Each of the sub CPUs includes an execution unit for decoding the macro instruction received from the main CPU into one or more micro instructions for execution; a holding unit for holding an execution result obtained through execution of the plurality of micro instructions; and a READY signal unit for providing the READY signal to one of the buses when sending the execution result to the holding unit for receiving the result. At least one of the sub CPUs has additional buses for transferring instructions, data and control signals, and the hierarchical structure processor further comprises at least one CPU element connected to the additional buses for executing at least part of the micro instructions under control of at least one of the sub CPUs.

8 Claims, 6 Drawing Sheets

FIG. 1B

FIG. 1C SUB CPU

HIERARCHICAL STRUCTURE PROCESSOR HAVING AT LEAST ONE SUB-SEQUENCER FOR EXECUTING BASIC INSTRUCTIONS OF A MACRO INSTRUCTION

This application is a continuation of Ser. No. 07/907,551, filed Jul. 2, 1992, now abandoned.

BACKGROUND OF THE INVENTION

The present invention generally relates to an arithmetic operation processor for performing such operation as arithmetic operation and, more particularly, to a parallel processing type central processing apparatus which can be suitably used in such applications that can realize high-speed arithmetic operation.

An arithmetic operation processing apparatus is disclosed in U.S. Pat. No. 4,956,800 titled "ARITHMETIC OPERATION PROCESSING APPARATUS OF THE PARALLEL PROCESSING TYPE AND COMPILER WHICH IS USED IN THIS APPARATUS", issued Sep. 11, 1990 to Kametani, in which a plurality of CPUs are operated based on macro instructions, and the disclosure of which is incorporated herein by reference.

Also disclosed in JP-A-63-316133 is an arithmetic operation processing apparatus which comprises a macro instruction sequence processor and a host processor.

In order to enhance the real time processing ability and scalar processing ability in the prior art, there has been proposed an arithmetic operation processing apparatus which comprises a host processor, an arithmetic operation unit for performing arithmetic operation and a second processor for executing the arithmetic operational sequence of the arithmetic operation unit described on the host processor, wherein the host and second processors share the arithmetic operation unit to cause the second processor to execute the arithmetic operational sequence and concurrently therewith to cause the host processor to perform data inputting and outputting operations between a main memory and the register file of the arithmetic operation unit, whereby the parallel processing ability or parallelism of the hardware is effectively enhanced and the high speed arithmetic operation processing is realized.

The above prior art is excellent in the highspeed arithmetic operation processing, but in the prior art, sufficient consideration is not paid to the efficiency of the parallel processing operation when a multiplicity of processors are operated as if they were a single processor.

SUMMARY OF THE INVENTION

It is an object of the present invention to provide a high-speed central processing apparatus which automatically performs parallel processing of many basic operations of a processing sequence to be sequentially managed by a main sequencer by means of a plurality of processors to thereby realize high speed processing as a whole.

Another object of the present invention is to provide a CPU bus interconnection system which interconnects a plurality of CPUs present at a plurality of hierarchies to effectively realize parallel instruction processing.

Still another object of the present invention is to provide a system which, when a processor present at a level (hierarchy) sequentially issues an instruction (other than a STORE instruction) and data necessary for the instruction to one of sub CPUs present at a level lower than the former issuer CPU, eliminates the need for the synchronizing operation with the associated sub CPU or the waiting operation between the processors to avoid conflict in the inter-processing relation until the processor issues the STORE instruction to the sub CPU.

A further object of the present invention is to provide a system which shifts the output of a STORE instruction as late as possible, that is, optimizes the compiling operation of delaying the storing operation of necessary data from a sub CPU until the data actually becomes actually necessary to thereby facilitate the optimization of the efficiency of parallel processing operation between processors.

A still further object of the present invention is to provide an arithmetic operation processing system which can easily add a processing ability and function thereto by adding a new sub processor or processors with the same architecture at a level lower than a main CPU or a sub CPU.

Another object of the present invention is to provide a hierarchical structure processing apparatus in which instruction data can comprise a very small number of bits when compared with the prior art central processing apparatus and thus the entire amount of data to be fetched by a main CPU, which would be subjected to a very high load of instruction fetching operation in the prior art system, can be reduced to a large extent to thereby realize improved processing speed.

A further object of the present invention is to provide a processing system which can improve the performances of a sub CPU without adversely affecting the architecture of a main CPU, which is advantageous in future performance improvement.

A still further object of the present invention is to provide a processing system which can freely increase the number of sub CPUs so long as the processing ability of a main CPU is permitted and thus which can easily improve its connecting function and also improve the processing ability of parallel processing operations between the sub CPUs.

Another object of the present invention is to provide a processing system which can process on a parallel processing basis the macro instruction issuing operation from a main CPU to a sub CPU and the processing of instructions within the main CPU executable only therein.

In order to attain the above objects, in accordance with an aspect of the present invention, there is provided a hierarchical structure processor which comprises: a memory (3) for storing therein processing instruction code data described sequentially; a main CPU (1) connected to the memory (3) for fetching and decoding the processing instruction code data and generating an execution sequence, the main CPU having buses for transfer of instructions, data and control signals; and a plurality of sub CPUs (2a–2d) connected to the main CPU through the buses for executing a basic processing received from the main CPU. In the hierarchical structure processor, further, the main CPU (1) includes a bus controller (18) for sending a macro instruction indicative of the basic processing to one of the sub CPUs and for receiving an execution result of the processing designated by the macro instruction from the associated sub CPU. The bus controller has a function of awaiting a READY signal from the associated sub CPU having said execution result. Furthermore, each of the plurality of sub CPUs (2a–2d) includes an execution unit (30) for decoding the macro instruction received from the main CPU into one or a plurality of micro instructions for execution; a holding unit (38) for holding therein an execution result obtained through execution of the plurality of micro instructions; and a READY signal unit (28) for providing the READY signal to one of the buses when sending the execution result to said holding unit for receiving said execution result by said main CPU. At least one of the plurality of sub CPUs has additional buses for transfer of instruction, data and control signal, and the hierarchical structure processor further comprises at least one CPU element connected to the additional buses for executing at least part of the micro instructions under control of at least one of the plurality of sub CPUs.

In accordance with another aspect of the present invention, there is a central processor of a hierarchical parallel processing type which comprises: a main CPU having a function of executing an instruction string described sequentially; a main resource accessible from the main CPU; a sub CPU having a function of executing processing operation in response to a macro instruction received from the main CPU and having a function of outputting an execution result of a previous macro instruction issued before the former macro instruction in response to a STORE instruction in a bus cycle of the main CPU; and means for transmitting the macro instruction and operand data necessary for execution of the macro instruction to the sub CPUs, wherein the macro instruction includes information which causes the sub CPU to execute its operation using data held in memory means within the sub CPU or data transferred as the operand data when the main CPU issues the macro instruction, the STORE instruction includes information which designates target data held in the memory means of the sub CPU and which causes output of the target data in response to a store bus cycle of the main CPU generated at the time of issuing the STORE instruction, the function of executing the STORE instruction, when the memory means having the target data present therein is changed in response to the execution of the previously-issued macro instruction, has means for outputting a wait signal for prolonging the store bus cycle of the main CPU to await the main CPU until the change of the memory means is completed.

In the present invention, when a processor present at a level (hierarchy) sequentially issues an instruction (other than a STORE instruction) and data necessary for the instruction to one of the sub CPUs present at a level lower than the former issuer CPU, the need for the synchronizing operation with the associated sub CPU or the waiting operation between the processors can be eliminated to avoid conflict in the inter-processing relation until the processor issues the STORE instruction to the sub CPU. When the output of a STORE instruction is shifted as late as possible, that is, when the compiling operation of delaying the storing operation of a necessary data from a sub CPU is optimized until the data actually becomes necessary, the optimization of the efficiency of parallel processing operation between processors can be facilitated.

DESCRIPTION OF THE PREFERRED EMBODIMENTS

An embodiment of the present invention will be detailed with reference to FIGS. 1A, 1B and 2C.

Figure 1A:
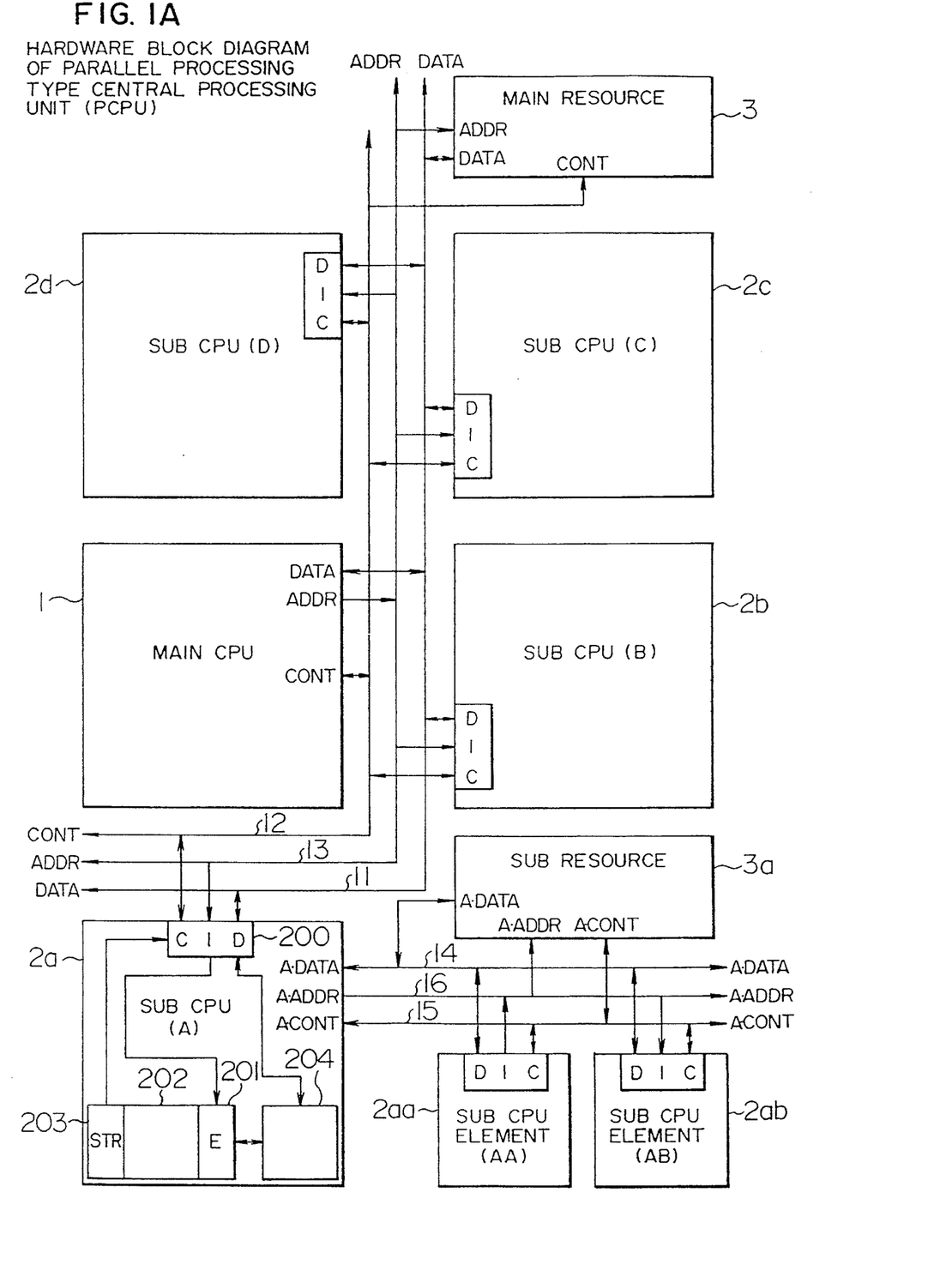
FIG. 1A is a block diagram of a general hardware arrangement of a central processing apparatus of parallel processing type in accordance with an embodiment of the present invention.

Referring first to FIG. 1A, there is shown a block diagram of a general hardware arrangement of a parallel processing type central processing unit (which will sometimes be referred to as the PCPU, hereinafter) in accordance with an embodiment of the present invention. The illustrated PCPU includes a main CPU 1, more than one sub CPUs 2 (four sub CPUs 2a to 2d, in the illustrated example), and a main resource 3 representative of a memory sub system such as a main memory. Interconnection between the main CPU 1 and the respective sub CPUs 2a to 2d is effected by means of a data bus DATA 11, a control bus CONT 12 and an instruction bus. The respective sub CPUs 2a to 2d are operated usually under control of the main CPU 1. In the illustrated example, the instruction bus is replaced by a common part of an address bus ADDR 13. That is, part of the address bus ADDR 13 is used to give instructions indicative of the contents of the respective sub CPUs 2a to 2d thereto. Further, some of the instructions may be given to the sub CPUs 2a to 2d with the contents of the data bus DATA 11 containing sub instructions through the address bus ADDR 13, depending on the types of instructions. Each of the sub CPUs receives at their interface input/output D data on the data bus DATA 11 to be processed, or outputs a processed result onto the data bus DATA 11. Similarly, each sub CPU performs at its interface input I transfer of necessary instruction data to be executed and also performs at its interface input/output C transfer of necessary control signals (including, for example, a strobe signal for effective instruction activation a READY signal indicative of the fact that an instruction execution result is already provided onto a data bus).

Figure 1B:
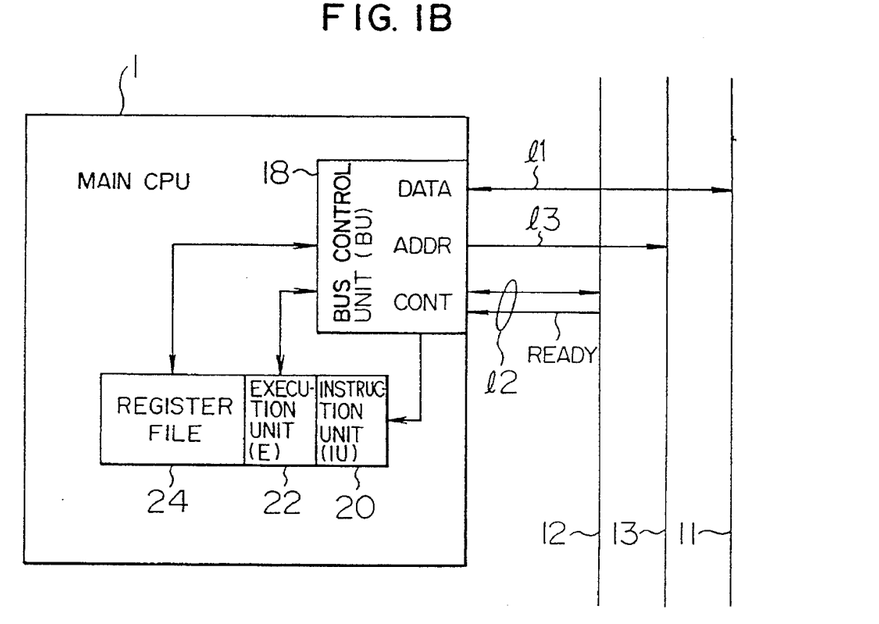
FIG. 1B is a block diagram of a main CPU in the central processing apparatus of FIG. 1.
Figure 1C:
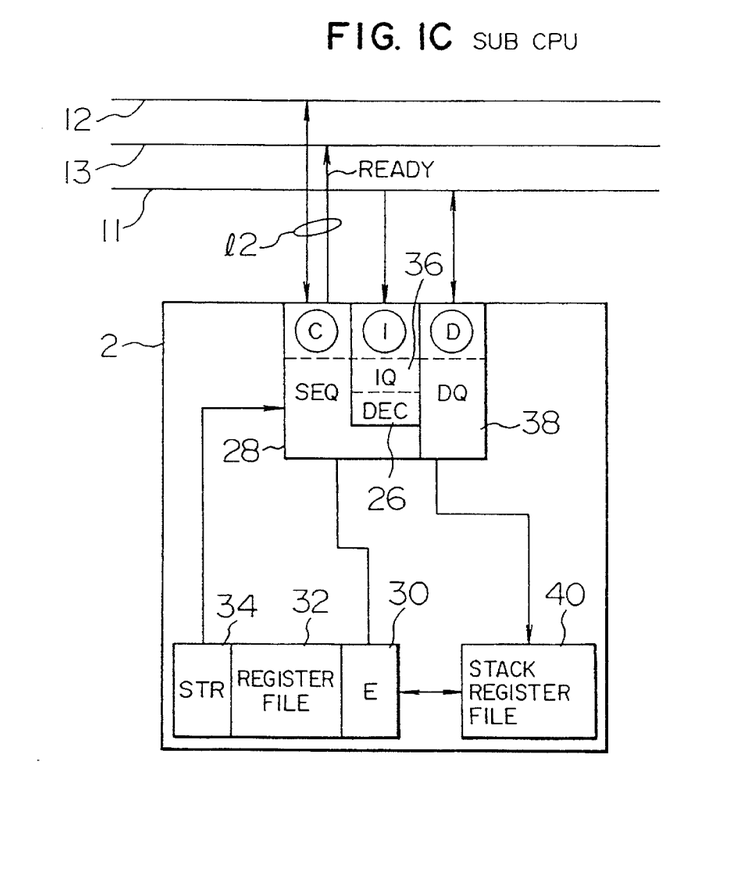
FIG. 1C is a block diagram of one of the sub CPUs in the central processing apparatus of FIG. 1.

A bus control unit (BU) 18 shown in FIG. 1B controls external buses 11, 12 and 13 to execute its transferring operation of data (such as instruction data and operand data) between the CPU and external sub CPU sub resources. In order to accept an execution result from the sub CPUs, the bus control unit 18 has a function of waiting for assertion of the READY signal on the bus 12. An instruction unit (IU) 20 receives instruction data from the bus control unit, generates a necessary execution sequence including decoding of the received instruction data, and gives an instruction to an execution unit (E) 22. The execution unit 22 has a register file 24 which, when receiving the instruction from the instruction unit 20, executes the received instruction.

In FIG. 1A, the sub CPU (A) 2a has, as its sub systems, sub CPU elements (AA) 2aa and (AB) 2ab and a sub resource 3a, which are all under control of the sub CPU (A) 2a. That is, the sub CPU (A) 2a is arranged in the same manner as the main CPU 1 is arranged.

Referring to FIG. 1C, an instruction queue (IQ) 36 is a unit which, when a next macro instruction is externally issued prior to the completion of execution of a previously-issued macro instruction, temporarily stores the next macro instruction. A decoder unit (DEC) 26 connected to the instruction queue (IQ) 36 decodes the macro instruction received from its instruction unit I and prepares a basic instruction string indicative of the macro instruction (resolves it into a string of basic instructions). A sequencer unit (SEQ) 28 sequentially sends the string of basic instructions in a correct order. The sequencer unit (SEQ) 28 also manages data transfer between a data unit (D) and an execution unit (E) 30 and between a stack register file 32 and a store unit (STR) 34. A data queue (DQ) 38 has a function of temporarily storing therein an operand data externally issued under substantially the same condition as the instruction queue (IQ) 36. A stack register file 40 is 10 used by the execution unit 30 when the execution of an instruction is desired.

The READY signal shown in FIGS. 1B and 1C has the following function. That is, in execution of a STORE instruction, when the processed result based on the previously-issued macro instruction is not yet returned to a memory means (destination register) and under such a condition, when it is desired to externally output the contents of the memory means, the READY signal becomes inactive to inform the main CPU of whether or not the memory means is in such a READY state that correct result data can be extracted from the memory means.

The sub CPU (A) 2a has an exclusive data bus (ADATA) 14, an address bus (AADDR) 16 and a control bus (ACONT) 15, which are connected to the aforementioned sub systems substantially in the same manner as the main CPU 1 are connected. As will be clear from the wiring configuration of FIG. 1A, the illustrated parallel processing type central processing apparatus has a hierarchical parallel processing structure. More specifically, the 4 sub CPUs 2a to 2d are connected in parallel to the main CPU 1 in one hierarchy under control of the main CPU 1, while the 2 sub CPU elements 2aa and 2ab are connected in parallel to the sub CPU (A) 2a in one hierarchy under control of the sub CPU 2a, that is, in the form of a hierarchical structure. When the sub CPU (A) 2a is viewed from the main CPU 1, the instruction executing operation of the sub systems under control of the sub CPU (A) 2a is not observed by the main CPU 1 but rather it is observed as if the main CPU 1 issues all instructions directly to the sub CPU (A) 2a and the sub CPU (A) 2a executes the instructions. The sub CPU (A) 2a receives an instruction (macro instruction) from the main CPU 1, divides the received instruction into smaller instruction divisions (micro instructions), executes certain ones of the micro instructions, and further divides the other micro instruction executable by the sub CPU elements 2aa and 2ab into instruction sub-divisions (micro instructions) to execute necessary functions. It is assumed in this specification that an instruction at an upper level is referred to as a macro instruction and an instruction division at a lower level is referred to as a micro instruction. For example, when a simple macro instruction (corresponding to an instruction for storing it into the main CPU, in this case) for merely reading out the storage contents of the sub resource 3a onto the data bus (DATA) 11 is provided from its upper level to the sub CPU (A) 2a, the macro instruction is executed at the sub CPU (A) 2a as a macro instruction, since the macro instruction is such a basic instruction that cannot be further divided into smaller instructions. That is, when the sub CPU (A) 2a outputs suitable signals onto the address bus (AADDR) 16 and the control bus (ACONT) 15 to read out target data from the sub resource 3a onto the data bus (DATA) 14, the sub CPU (A) 2a passes the read-out data to its interface input/output D as it is and outputs it onto the data bus (DATA) 11. The main CPU 1 cannot observe the structure being controlled by the sub CPU (A) 2a at all, but rather it is merely observed as if the main CPU reads out the data present at an address of the memory system of the sub CPU (A) 2a specified by the macro instruction. Similarly, even when a complex macro instruction is issued, the main CPU 1 cannot observe at all how the macro instruction is divided within the sub CPU (A) 2a and executed in which sub system and further such observation is unnecessary. The main CPU can later merely see the result into which the macro instruction is executed at the sub CPU (A) 2a and which is returned to the specified address of the memory system of the sub CPU (A) 2a.

Explanation will next be made as to an exemplary operational sequence of the present embodiment by referring to FIG. 2.

In the drawing, reference symbols IA, IB, IC and ID denote macro instructions directed to the respective sub CPUs (A), (B), (C) and (D) from the main CPU 1, while symbols SA, SB, SC and SD denote STORE instructions for storing result data from the memory systems (such as registers, sub resources and stacks) of the sub CPUs (A), (B), (C) and (D) to the data bus (DATA) 11. Similarly, even between the sub CPU (A) 2a and the sub CPU elements (AA) 2aa and (AB) 2ab under control of the sub CPU 2a, symbols IAA and IAB denote macro instructions directed to the respective sub CPU elements (AA) 2aa and (AB) 2ab from the sub CPU (A) 2a, while symbols SAA and SAB denote STORE instructions for storing result data from the respective sub CPU elements (AA) 2aa and (AB) 2ab to the sub CPU (A) 2a. Further, symbol DT indicates data transfer with the resource or fetch of the instruction data from the resource. Symbol D indicates a state in which a STORE data from a lower level is being output to the data bus under control of the main CPU 1 or the respective sub CPUs 2a to 2d. More specifically, D denotes a result data output from the sub systems (sub CPUs 2a, 2b, 2c, 2d and main resource 3) to the data bus (DATA) 11 under control of the main CPU 1; while D denotes a result data output from the sub systems (sub CPU elements 2aa and 2ab and sub resource 3a) under control of the sub CPU (A) 2a. In the present embodiment, when it is desired for an upper level CPU to obtain result data from its sub CPU, the upper level CPU issues a STORE instruction to the sub CPU. The sub CPU, when receiving the STORE instruction, outputs to the upper level CPU result data present at the address of the memory system specified by the STORE instruction. In this connection, the aforementioned instruction queue (IQ) 36 operating as a synchronous system between the sub CPU and its upper level system has such a function that, when the STORE instruction is issued from the upper level system but the sub CPU does not yet complete the setting operation of the result data to the specified address of the memory system, the upper level system waits for the completion of the setting of the result data. Symbol I in FIG. 2 represents an instruction which can be processed only in the main or sub CPU. This means that, since no data exchange is carried out with another CPU during execution of the instruction I, each CPU can be freely operated without any interference from the other CPUs. Symbol SI indicates the execution of a STORE instruction.

Figure 2:
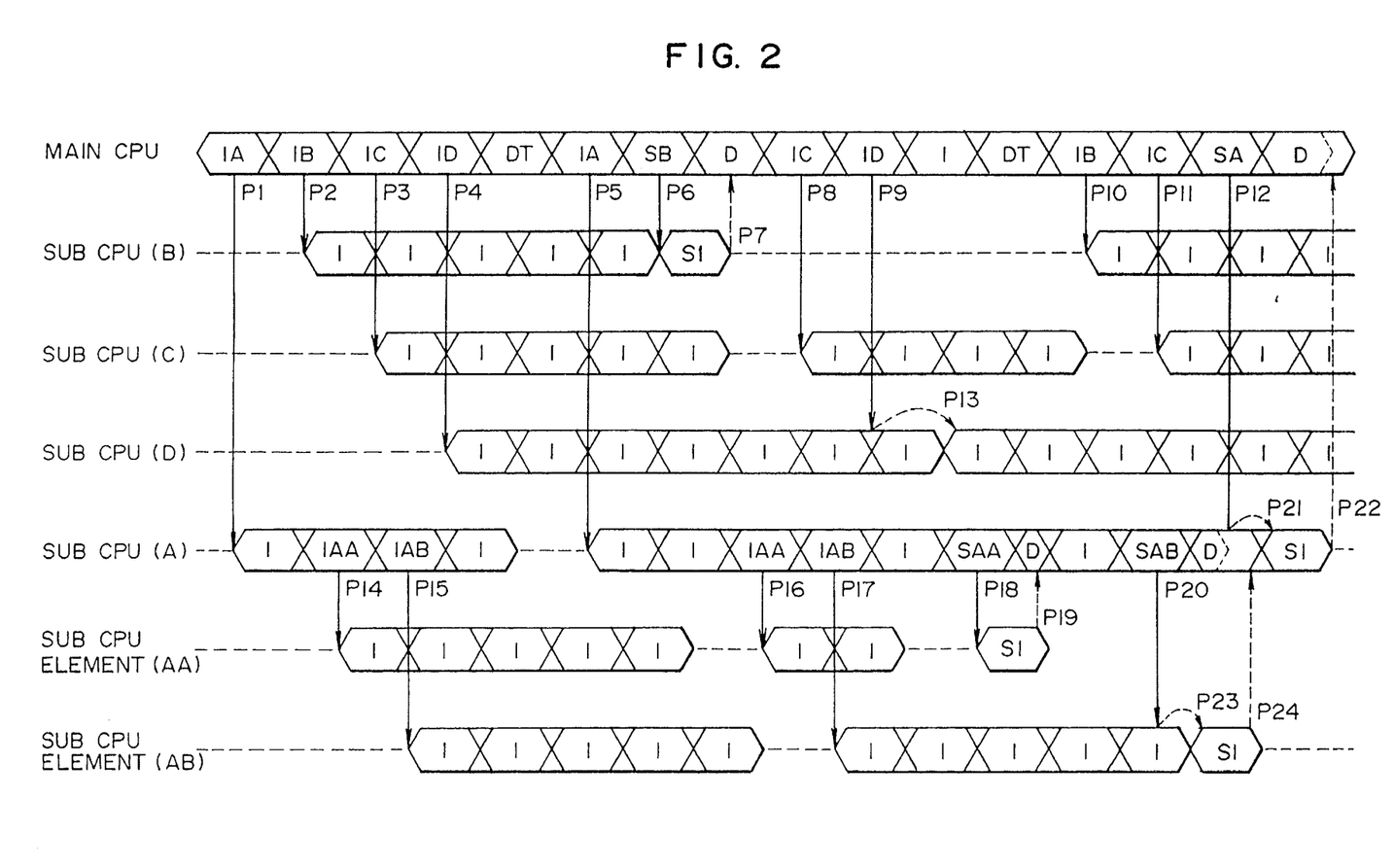
FIG. 2 is a timing chart for explaining an exemplary operational sequence of the present invention.

The parallel operational sequence of FIG. 2 is controlled based on an instruction executed by the main CPU 1 and on macro instructions to the sub CPUs. The processing of the instruction executed by the main CPU 1 is completely carried out sequentially and can be described by a known sequential programming method. That is, it will be seen that a programmer is required to describe only programs on the main CPU 1. The main CPU 1 first issues the macro instructions IA, IB, IC and ID to the sub CPUs (A), (B), (C) and (DD) at points P1, P2, P3 and P4 respectively. The respective sub CPUs (A), (B), (C) and (DD) can be continuously operated concurrently with the main CPU 1 until the main CPU 1 issues a STORE instruction. When the sub CPU (A) first completes its processing operation, the main CPU 1 issues the next macro instruction IA to the sub CPU (A) at a point P5. In this case, in order to temporarily store one or more macro instructions previously issued until the processing unit of the sub CPU starts its execution, an instruction storage system or an instruction queue (IQ) is previously provided in the sub CPU. Even when the processing of the previous macro instruction is not yet completed, if the macro instruction to be issued next is a macro instruction IX other than the STORE instruction SI, then the main CPU 1 may previously issue the macro instruction IX to the sub CPU and it is unnecessary for the main CPU 1 to wait for the completion of the processing of the previously issued macro instruction. The main CPU 1 issues the STORE instruction SB to the sub CPU (B) at a point P6 to request the storing operation of result data required by the sub CPU (B). In the present example, since the processing of the previous macro instruction of the sub CPU (B) is completed just at the point P6 and result data is obtained, the sub CPU (B) immediately accepts the STORE instruction SB, executes the storing operation SI, and at the data fetch state D of a point P7, outputs the result data to the data bus (DATA) 11 being controlled by the main CPU 1. Similarly, the main CPU 1 issues the macro instruction IA to the sub CPU (A) at the point P5, the macro instruction IC to the sub CPU (C) at a point P8, the macro instruction ID to the sub CPU (D) at a point P9, and the macro instruction IB to the sub CPU (B) at a point P10, respectively. Except for the macro instruction ID at the point P9, the processing of the previous macro instruction is already completed prior to the time the instruction was issued, and the sub CPU in question, which is in its non-execution or idle state (represented by dotted lines), can receive the next macro instruction. For this reason, the sub CPU in question immediately accepts the macro instruction and immediately starts its execution. The macro instruction ID issued from the main CPU 1 at the point P9, since the sub CPU (D) is still executing the previous macro instruction, as already explained above, is once stored in the instruction queue system provided in the sub CPU (D). At a point P13 at which the processing of the previous macro instruction is completed, the sub CPU (D) extracts the macro instruction ID from the instruction queue system and starts its execution. Accordingly, the execution of the processing of the main CPU 1 and the execution of the processing of the sub CPU (D) are carried out completely concurrently without any interference therebetween.

Next, explanation will be directed to the operational sequence of the sub CPU (A) as a reference CPU and the sub CPU elements (AA) and (AB) being controlled by the sub CPU (A). At the point P1, first, the sub CPU (A) accepts the macro instruction IA issued from the main CPU 1 to the sub CPU (A) and starts the execution of the accepted macro instruction. At points P14 and P15, the sub CPU (A) issues the micro instructions IAA and IAB to the sub CPU elements (AA) and (AB) being controlled by the sub CPU (A). Since the macro instruction IA at the point P1 contains no STORE instructions directed from the sub CPU (A) to the sub CPU elements (AA) and (AB), the sub CPU (A) can complete the processing of the macro instruction IA without waiting for the completion of the processing of the micro instructions IAA and IAB at the sub CPU elements (AA) and (AB). At the point P5, the main CPU 1 issues the next macro instruction IA to the sub CPU (A). The sub CPU (A), which is then in the idle state, immediately accepts the macro instruction IA and simultaneously starts its execution. The sub CPU (A) issues the micro instructions IAA and IAB to the sub CPU elements (AA) and (Ab) at points P16 and P17 respectively. At a point P18, since the sub CPU (A) requires the result data of the sub CPU element (AA), the sub CPU (A) issues the STORE instruction SAA to the sub CPU element (AA). Since the sub CPU element (AA) already finishes the necessary processing at that time, the sub CPU element (AA) immediately executes the STORE instruction SAA (see SI), and outputs its result data to the data bus (ADATA) 14 in the data fetch state D at a point P19. The sub CPU (A) immediately obtains the result data from the data bus 14 and stores it at the corresponding address of the memory system (such as register file) designated by the macro instruction IA at the point P5.

Similarly, the sub CPU (A) requires the result data of the sub CPU element (AB) at a point P20 and thus issues the STORE instruction SAB to the sub CPU element (AB). At this point, the sub CPU element (AB) is executing the last basic instruction I of the macro instruction IAB issued at the point P17 and does not yet obtain the necessary result data. For this reason, the STORE instruction SAB is not executed immediately and the sub CPU (A) is placed in its wait state (represented by dotted lines) until the necessary processing of the sub CPU element (AB) is completed in the data fetch state D of the STORE instruction SAB. The sub CPU element (AB) completes at a point P23 the processing necessary for the macro instruction IAB of the point P17, and outputs to the data bus (ADATA) 14 the result data in an execution state SI of the STORE instruction. Result data output at a point P24 from the sub CPU element (AB) is fetched by the sub CPU (A) and thus the data fetch state D being awaited is completed. Concurrently with the above operation, the main CPU 1 issues the STORE instruction SA to the sub CPU (A) at a point P12 to request the final result data of the macro instruction IA issued at the point P5. If the final result is the same as the result data obtained at the point P24, then the sub CPU (A) directly handles the result data at a point P21 and executes the storing state SI associated with the STORE instruction SA issued at the point P12. This state is called a direct pass mode in which data is directly passed from the lower level sub CPU. Since the necessary processing of the sub CPU (A) is not yet finished at that time like the STORE instruction SAB at the point P20, the main CPU 1 temporarily waits for its completion in the data fetch state D of the STORE instruction SA of the point P12. The main CPU 1, when obtaining the necessary result data at a point P22, completes the data fetch state D.

The parallel processing of the central processing operation based on the aforementioned system is called the hierarchical parallel processing system. This system has advantages (1) to (3) which are summarized below.

(1) A CPU present at a level (hierarchy) sequentially issues an instruction (other than the STORE instruction) and data necessary therefor to sub CPUs present at a level lower than the issuer CPU, therefore it is unnecessary for the issuer CPU to perform synchronizing operation with respect to the sub CPU until the issuer CPU issues the STORE instruction to the sub CPU (that is, it is unnecessary for the issuer CPU to perform the waiting operation between the CPUs to avoid any conflicts in their processing relations).

(2) By delaying the output of the STORE instruction as late as possible, that is, by optimizing the compiling of delaying the storing operation of the necessary data from the sub CPU until the data actually becomes necessary, the efficiency of the parallel processing operation between the CPUs can be easily optimized.

(3) By sequentially adding a new sub processing in the same architecture to CPUs lower in level than the main or sub CPU, a new processing ability and processing function can be easily added.

Explanation will next be made as to the architecture of an ordinary sub CPU with use of the sub CPU (A) 2a in FIG. 1.

Assume now that the sub CPU (A) 2a is such a coprocessor as, for example, a Floating point operation Processing Unit (FPU) which executes floating point operation and which takes the place of part of the processing function of the main CPU 1. The sub CPU (A) 2a comprises an interface unit 200 having such external interfaces C, I and D as already explained above, a register file 202, an execution unit (E) 201, a store unit (STR) 203 and a stack register file 204. The interface unit 200 receives a new macro instruction and data from the main CPU 1. If the execution of the previous instruction is not yet completed, then the new macro instruction and data are temporarily stored in such a temporary storage as an instruction queue and a data queue within the interface unit 200 so that the main CPU 1 can advance to the next processing without being delayed. Further, the instruction queue also may be designed to decode the macro instruction into basic instructions BI and to store these basic instructions BI in the instruction queue. The execution unit (E) 201 performs arithmetic operations for registers within the register file 202 or performs arithmetic operations over the data received from the registers of the register file 202 and from the main CPU 1 through the interface unit. The store unit (STR) 203 has a function of, in response to the STORE instruction received from the main CPU 1, outputting the contents of the specified register of the register file from the input/output interface D onto the data bus (DATA) 11 in the corresponding bus cycle of the main CPU 1. At this time, when the store unit (STR) 203 already receives the instruction from the main CPU 1 and among the previous macro instructions temporarily stored in the temporary storage of the interface unit 200, when there is such an instruction (macro instruction) that specifies at least the objective register designated by the store instruction as a destination register used to load the processed result of the macro instruction therein, the interface part C of the sub CPU (A) 2a sets the READY signal (when active, a control signal indicative of the end of the processing of the STORE instruction) of the STORE instruction received from the main CPU 1 to be temporarily fixedly inactive, whereby the synchronizing operation of awaiting the main CPU 1 is carried out to achieve synchronism between the main CPU 1 and the sub CPU (A) 2a. As a result, the processing sequence described on the main CPU 1 can be sequentially carried out so as not to cause any conflict in the data processing order between the respective CPUs. When the above condition is released, that is, when the processing of the macro instruction using the register designated by the STORE instruction as the destination register is fully completed, the READY signal is changed to its active state and the main CPU 1 shifts to the next executing operation. The stack register file 204, which is a memory unit within the sub CPU (A), has a function of, when a task switch takes place in the executing sequence of the main CPU 1, copying and stacking the contents of the register file, and also has a function of causing the execution unit (E) 201 to execute arithmetic operations using the data of the stack register file 204 in place of the external data from the main CPU 1. Further, the stack register file 204 can be accessed by the main CPU 1 as one of the memory resources. In other words, the main CPU 1 can access the stack register file 204 as the local memory of the main CPU 1. The sub CPU (A) 2a has such bus interface channel protocols ADATA, AADDR and ACONT as previously explained.

Explanation will then be made as to another interconnection, as an embodiment, between a CPU present at a hierarchical level and sub CPUs under control of the former CPU and present at a hierarchical level lower by one level than the former CPU, which interconnection is different from that of FIG. 1, and also as to features and effects thereof.

The embodiment of FIG. 3 will be explained. The instruction bus (I) substituted by the address bus (ADDR) 13 and the control bus (connected to the input interfaces C of the respective sub CPUs) substituted by the control bus (CONT) 12 to control the sub CPUs in the embodiment of FIG. 1; whereas a sub bus control unit 42 connected to sub CPUs through an instruction bus (SINST) S13 and a control bus (SCONT) S12 is provided in the main CPU 1 in the embodiment of FIG. 3. This system has the following features and effects.

(1) Access of the main CPU 1 to the main resource 3 caused by the address designation of the address bus (ADDR) 13 and the execution of processing of a macro instruction to the sub CPU (A) and (B) and processing of the sub CPU (A) and (B) can be carried out on a parallel basis. In the example of FIG. 1, part of the address bus (ADDR) 13 is used as an instruction bus for designation of the macro instruction. Accordingly, in the case where the macro instructions to be executed are limited to one type and the instructions are executed with respect to a plurality of operand data on the main resource, when the macro instructions are previously assigned to the sub CPUs, the accessing operation of the main CPU to the main source and the executing operation of the macro instructions at the sub CPUs can be carried out in a parallel manner. When the execution of different macro instructions are assigned to data on the main resource arranged randomly, the execution of the access to the main resource with use of the address bus (ADDR) 13 disables simultaneous issuance of macro instructions. In the present example, the designation of the arithmetic operation by a micro instruction can be carried out concurrently with the access to each of the data and concurrently with the accessing operation of the main CPU 1 to the main resource 3.

(2) When the main CPU 1 previously knows the macro instructions to be issued to the sub CPUs, that is, when the sequence is previously stored in the memory of the main CPU 1 or the main CPU 1 externally prefetches the sequence and previously stores the sequence in such a storage buffer as an instruction queue therein, the accessing operation of the main CPU 1 as well as the major part of the designating operation of the macro instruction to the associated sub CPU and the executing operation of the macro instruction at the sub CPU can be carried out on a parallel basis. The function of the main CPU of executing the designation of the macro instruction to the sub CPU concurrently with the fetching of the instruction data (instruction sequence) or operand data from the main resource is realized by the bus unit BU acquiring an instruction string from the main resource at a high speed, by the instruction unit (IU) classifying the instruction string into macro instructions to be given to the sub CPUs and instructions to be executed by its own, and then by the instruction unit (IU) distributing the former instructions to the sub bus control unit and the latter instructions to the execution unit at a high speed. In particular, when the sub CPU does not utilize the data on the main resource 3 (when the register file within the sub CPU can execute its processing with use of only the data on the stack register file), the accessing operation of the main CPU 1 to the main resource, the executing operation itself of the main CPU 1, the designating operation of the macro instruction of the main CPU 1 to the sub CPU, and the executing operation of the macro instruction of the sub CPU can be efficiently carried out in a completely parallel manner.

Figure 3:
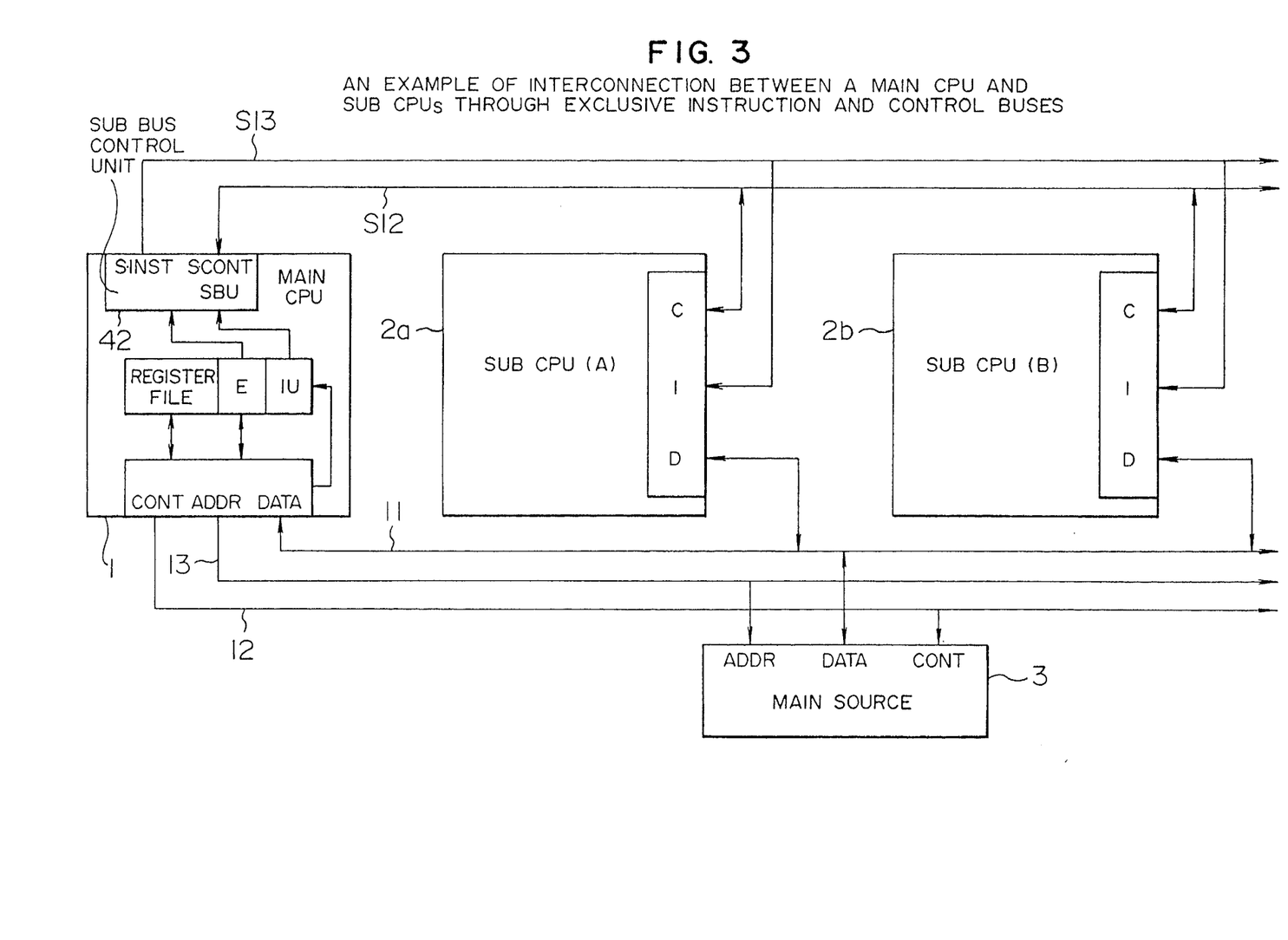
FIG. 3 shows another interconnection between the main CPU, the sub CPUs and a main resource interconnected thereto by means of an exclusive instruction bus, a control bus, and a data bus, which interconnection is different from that of FIG. 1.
Figure 4:
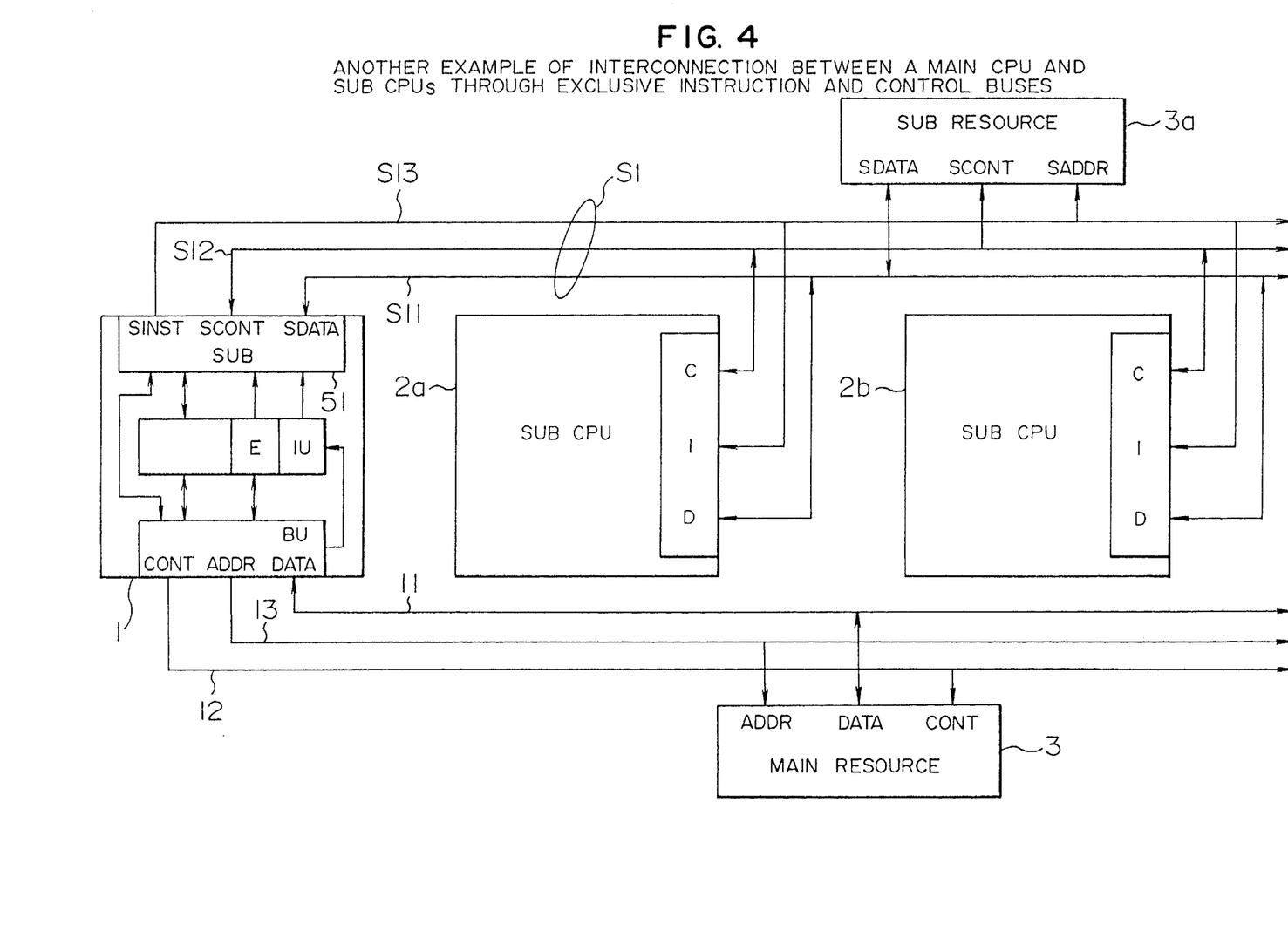
FIG. 4 shows a further interconnection between the main CPU having the sub CPUs and a main resource interconnected thereto by means of the exclusive instruction bus, control bus, and data bus.

Shown in FIG. 4 is an embodiment in which the sub CPUs (A) and (B) are not directly connected to the data bus (DATA) 11 but a data bus S11 for independent sub CPUs is provided in addition to the example of FIG. 3, so that the sub CPUs (A) and (B) are connected at their data input/output interfaces D to the data bus S11 to add their control functions to the sub bus control unit SBU. The present embodiment has the following features and effects (1) and (2).

(1) As in the case of FIG. 3, access of the main CPU 1 to the main resource 3 and the designation of the macro instructions to the sub CPUs (A) and (B) can be carried out on a parallel basis. In this connection, that part of the data of the main resource 3 which is associated with the processing of the sub CPUs (A) and (B) is handled through the main CPU 1 to be transferred between the sub CPUs and main resource 3.

(2) The sub resource 3a is provided on a bus system S1 (including the buses (SINST), (SCONT) and (SDATA)) for the sub CPUs so that, even when no access is made to the main resource 3, the sub CPUs can execute it with use of the data on the sub resource 3a. Therefore, in addition to the features and effects of Paragraph (2) of the embodiment of FIG. 3, the time during which the operation of the main CPU 1 and the operation of the sub CPU can be carried out completely in parallel.

The parallel processing within the sub CPU will then be described below.

As already explained above, the sub CPU is regarded, when viewed from the main CPU 1, as a coprocessor which executes one or more functions defined as a macro instruction. How to execute each of such functions can be freely determined on the side of the sub CPU, which results in that, so long as such a condition is satisfied that when the STORE instruction is issued to the main CPU 1, the necessary result data is passed to the main CPU 1, no conflict will occur in the entire sequence to be executed on the main CPU 1. Accordingly, the configuration and processing system of the sub CPU have the following features and flexibility.

(1) Sub CPUs are provided to be present at a level lower than a level at which another CPU is present to realize such hierarchical parallel processing as mentioned above, thus realizing the improvement of the function and performance.

(2) The sub CPU resolves therein an instruction (e.g., macro instruction or micro instruction) obtained from an upper level into smaller basic instructions to perform parallel processing between these basic instructions, whereby the processing performance can be further improved.

The parallel processing type central processing apparatus of the foregoing embodiment has the following merits (1) to (4) over the prior art.

(1) Since a plurality of basic operations can be expressed as one machine instruction word in the form of a macro instruction, an instruction data in the present invention can consist of a very small number of bits when compared with the prior art central processing apparatus. The instruction fetching operation requires the main CPU to handle half of the quantity of data, which disadvantageously imposes a very high load on the main CPU. In the present embodiment, however, because of the employment of the expression of a plurality of basic operations into one machine instruction word, the entire quantity of data to be fetched by the main CPU can be remarkably reduced when compared with the prior art system and therefore a processing speed can be correspondingly improved.

(2) Improvement of the performance of the sub CPU (e.g., parallel processing within the sub CPU) can be carried out without adversely affecting the architecture of the main CPU, which is advantageous in future performance improvement.

(3) The number of sub CPUs can be freely increased so long as the processing ability of the main CPU 1 is permitted, so that the interconnecting function and the processing ability of the parallel processing between the sub CPUs can be easily improved.

(4) Because of the separate provision of the instruction bus (refer to the embodiments of FIGS. 3 and 4), the designating operation of the macro instruction of the main CPU to the sub CPU and the instruction processing of the main CPU executable only in the main CPU can be carried out in a parallel processing manner, so long as no conflict can be caused in the program sequence and a correct result data can be obtained.

Figure 5:
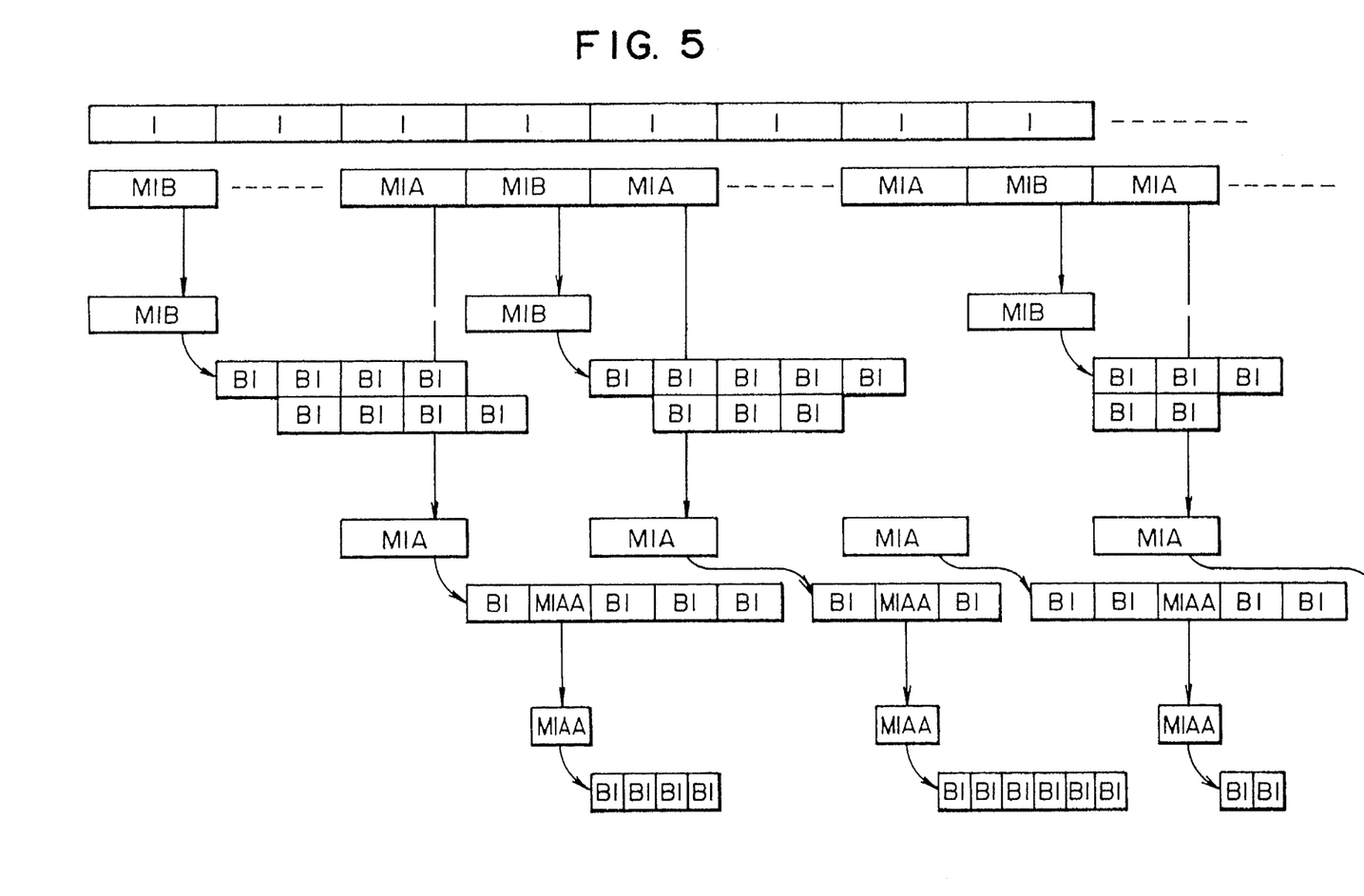
FIG. 5 is a diagram for explaining the hierarchical parallel processing of the present system.

FIG. 5 summarizes the parallel processing structure of the hierarchical parallel processing type central processing apparatuses of the foregoing embodiments. The main CPU, which has such an exclusive instruction bus S13 as shown in FIGS. 3 and 4, can output the macro instruction (MI) to the sub CPU concurrently with the instruction processing (I) executed thereat. The main CPU has the sub CPUs (A) and (B) connected thereto as its lower level, and the sub CPUs are operated in response to macro instructions MIA and MIB received from the main CPU. The sub CPU (A) has the sub CPU (AA) connected thereto as its lower level and the sub CPU (AA) is operated in response to a micro instruction MIAA received from the sub CPU (A). The respective sub CPUs, when receiving the macro instruction MIA or MIB or the micro instruction MIAA from its upper level, divide their instruction into basic instructions BI, each as a primitive processing unit to be processed by the execution unit. As already explained above, the sub CPU (A) performs the hierarchical parallel processing operation with the sub CPU (AA) present at its lower level. The sub CPU (B) has a plurality of execution units therein by which the basic instructions BI are shared for their parallel processing. With respect to a macro instruction issued from an upper level, when its processing algorithm is prescribed as one function, the parallelism between the basic instructions or micro instructions made up of the macro instruction can be previously known clearly, and such a processing structure of the sub CPUs as to make the most of the parallelism can be prescribed at its design stage with the improved performance. Conversely, when a function having a high parallel processing ability at a basic instruction level is prescribed as a macro instruction, more effective parallel operation can be expected.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A hierarchical structure processor, comprising:

memory means for storing therein instructions including information for generating macro instructions and store instructions and data which are described sequentially for execution;

a first sequencer connected through buses for transferring instructions, data and control signals to and from said memory means for fetching and decoding said instructions and generating macro instructions and said store instructions from said instructions to manage an executing sequence thereof; and at least one second sequencer operating in parallel with said first sequencer, connected to said first sequencer through said buses for executing one or a plurality of basic instructions corresponding to a macro instruction received from said first sequencer, wherein said first sequencer includes bus control means for sending a plurality of basic instructions corresponding to a macro instruction to said at least one second sequencer, for sending a store instruction for fetching an execution result from said at least one second sequencer when said store instruction is issued by an upper hierarchy level system including said first sequencer, and for receiving an execution result of a processing designated by said basic instructions corresponding to said macro instruction from said at least one second sequencer, said bus control means having a function of awaiting a READY signal indicating completion of processing designated by said basic instructions corresponding to said macro instruction;

wherein said at least one second sequencer includes:

interface means for holding a macro instruction received from said bus control means of said first sequencer, a plurality of register means for holding at least one execution result obtained through execution of said one or a plurality of macro or basic instructions, execution means for decoding said macro instruction received from said first sequencer into one or a plurality of basic instructions for execution and executing said basic instructions to return said execution result to said register means designated by said macro or basic instruction, and means for inhibiting provision of said READY signal when a processed result of said basic instructions corresponding to said macro instruction which was issued before said store instruction and held in said interface means is not yet returned to said register means under a condition that said store instruction is to output a content of said register means, wherein said bus control means of said first sequencer does not perform a synchronizing operation for macro instructions until said condition is met.

2. A hierarchical structure processor as set forth in claim 1, wherein said at least one second sequencer has additional buses for transferring instructions, data and control signals, and further comprises at least one third sequencer connected to said additional buses for executing at least part of said plurality of micro instructions under control of said at least one second sequencer.

3. A hierarchical structure processor as set forth in claim 2, wherein said first sequencer includes a sub bus control unit connected to said at least one second sequencer through third buses for transmitting said instructions and said control signals thereto.

4. A hierarchical structure processor as set forth in claim 2, wherein said at least one second sequencer includes execution and instruction units (IU, E) for executing part of said plurality of micro instructions and sending the remaining data to said plurality of third sequencers.

5. A hierarchical structure processor as set forth in claim 1, wherein said at least one second sequencer includes an instruction queue for holding therein the macro instruction to be sent next to said macro instruction from said first sequencer.

6. A hierarchical structure processor as set forth in claim 1, wherein said first sequencer includes execution and instruction units for executing part of said macro instruction code data and sending remainder data to said at least one second sequencer.

7. A hierarchical structure processor as set forth in claim 1, wherein said first sequencer includes a sub bus control unit connected to said at least one second sequencer through third buses for transmitting said instruction and said control signals thereto.

8. A hierarchical structure processor as set forth in claim 1, wherein said first sequencer includes a sub bus control unit connected to said at least one second sequencer through third buses for transmitting data, instruction and control signals thereto.

* * * * *